Dec. 1, 1959  W. H. NORTON  2,915,613
HEATING SURFACE
Filed Nov. 29, 1955  2 Sheets-Sheet 1
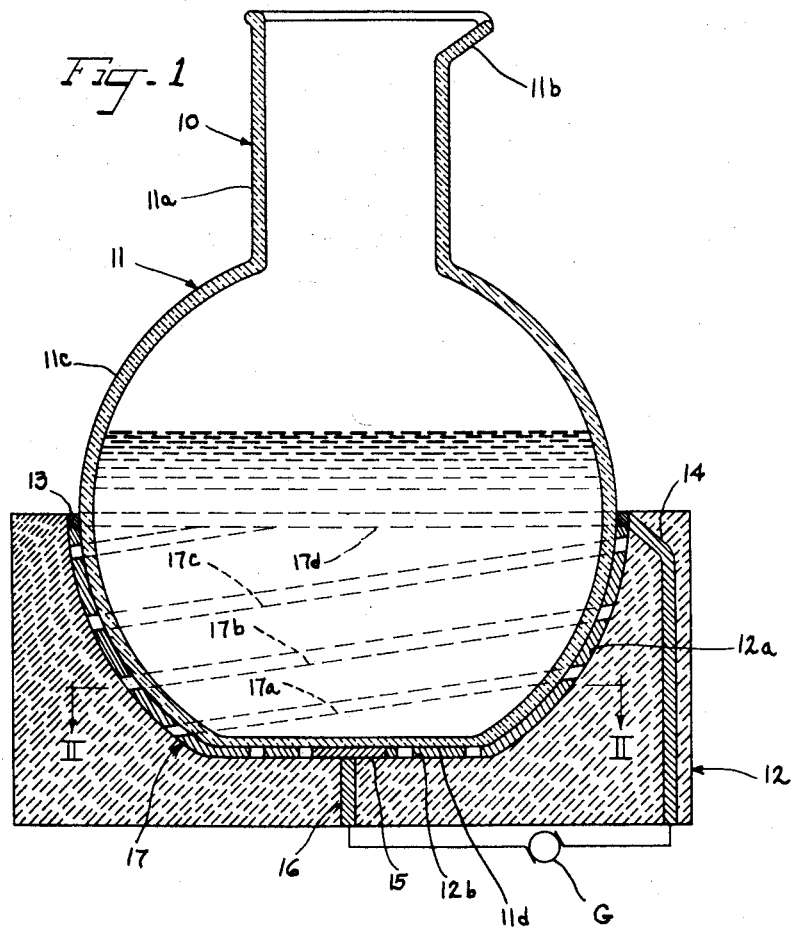
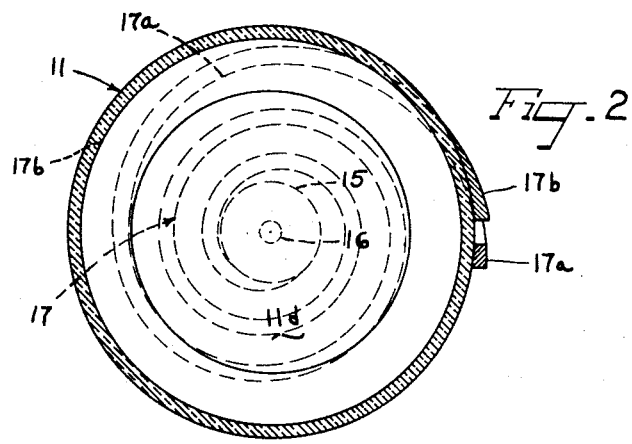
Inventor
WILLIAM H. NORTON
by Hill, Sherman, Meroni, Gross & Simpson
Attys.

Dec. 1, 1959   W. H. NORTON   2,915,613
HEATING SURFACE
Filed Nov. 29, 1955   2 Sheets-Sheet 2
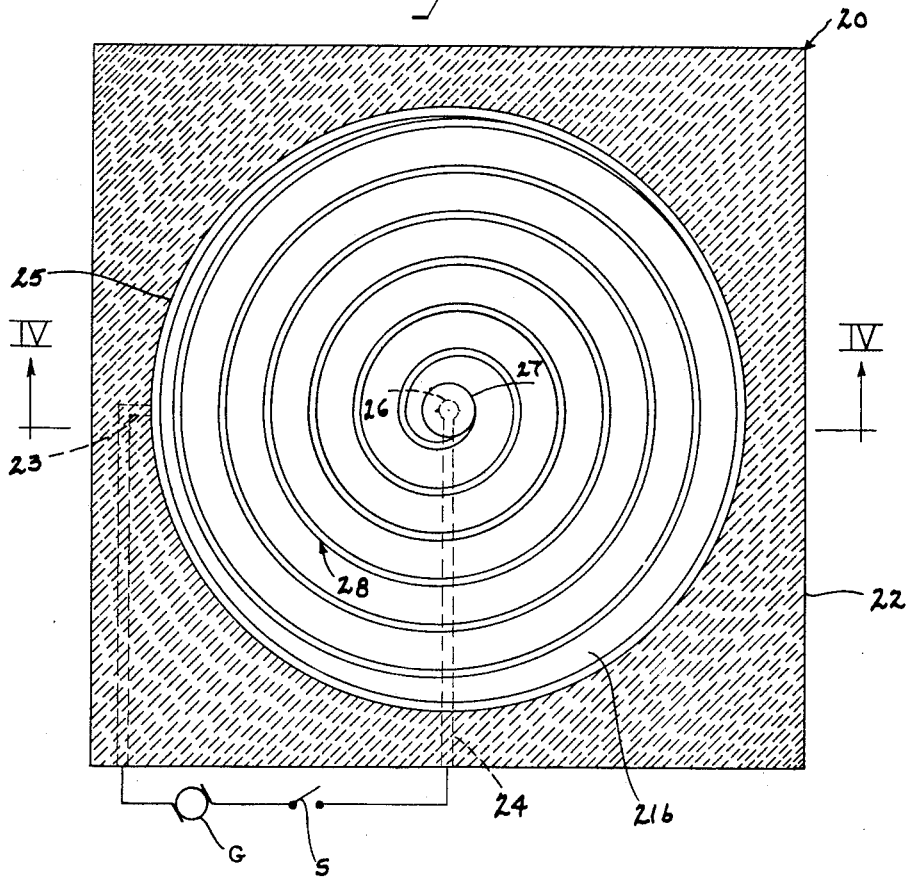
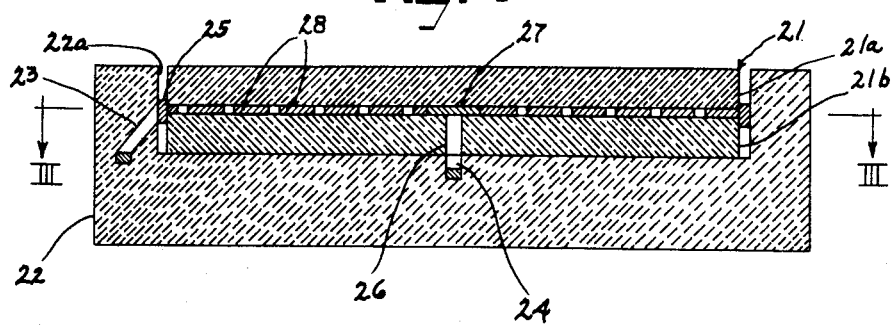
Inventor
WILLIAM H. NORTON

2,915,613
HEATING SURFACE
William H. Norton, Chicago, Ill.

Application November 29, 1955, Serial No. 549,651

4 Claims. (Cl. 219—44)

The instant invention relates to a process and apparatus for producing heat, and more particularly, to an improved process and apparatus for producing heat comprising a novel heating element.

Although the instant invention may have application in a number of fields, it will be described first with particular attention to its application in the field of heating glass vessels or similar devices, for example, for the purpose of boiling liquids therein. In commercial laboratories a number of liquids may be heated, for example, to boiling temperatures for test purposes. Also, in the home such devices as coffee makers involve the heating of water to boiling. In each case, a rather substantial amount of time is consumed in heating the liquid to its boiling temperature. In industry, this is wasted time, and to the housewife this delay is a source of annoyance.

In a preferred embodiment of the instant invention, a particular type of heating element is mounted on a glass vessel so that this vessel may be used for the boiling of liquids or other heating purposes, so as to obtain an extremely rapid rate of heating. The instant heating element is unique in that it may be mounted on the glass vessel and, although it reaches elevated temperatures during the heating operation, separation between the heating element and the glass vessel does not occur. In addition, the instant heating element possesses the unique property of heating up very rapidly when an electric current is applied thereto and cooling very rapidly when the electric current is shut off. This latter feature is most unusual for heating elements, practically all of which possess a definite "lag" in cooling down after the electric current has been shut off.

The instant heating element is nickel deposited in a very thin layer by a well known chemical process referred to commercially as "electroless" nickel plating. One aspect of the instant invention involves the use of such nickel coatings in substantially smaller than the recommended thickness on an insulator body such as glass.

Electroless nickel plating or coating is described in detail in a number of patents, including Talmey U.S. Patent No. 2,658,839, Gutzeit U.S. Patent No. 2,658,841, Gutzeit U.S. Patent No. 2,658,842, Gutzeit U.S. Patent No. 2,690,401, Crehan U.S. Patent No. 2,690,402, Gutzeit U.S. Patent No. 2,690,403, Reschan U.S. Patent No. 2,694,017, Gutzeit U.S. Patent No. 2,694,019, Gutzeit U.S. Patent No. 2,697,651, and Talmey U.S. Patent No. 2,717,218. In particular, Gutzeit Patents Nos. 2,690,401 and 2,690,403 and Crehan Patent No. 2,690,402 describe the application of such coatings to non-metallic materials such as glass. The instant invention is based upon the discovery that such nickel coatings may be applied to an insulator body so as to provide a unique heating element.

It is, therefore, an important object of the instant invention to provide an improved method of producing heat and an improved device for producing heat.

It is a further object of the instant invention to provide an improved process for producing heat which comprises depositing nickel in a very thin layer on an insulator body from an aqueous solution of a nickel salt and a hypophosphite, followed by passing an electric current through said layer to heat the same.

Still another object of the instant invention is to provide an improved heating unit which comprises a solid electric insulator body, spaced electrical contacts mounted on the body, and a heating element of said deposited nickel extending between said contacts on an elongated surface portion of the body.

Other and further objects, features and advantages of the present invention will become apparent to those skilled in the art from the following detailed disclosure thereof and the drawings attached hereto and made a part hereof.

On the drawings:

Figure 1 is a sectional elevational view of a heating unit embodying the instant invention which comprises a glass vessel;

Figure 2 is a sectional view taken substantially along the line II—II of Figure 1;

Figure 3 is a top plan view of another heating unit embodying the instant invention, with parts broken away and parts shown in section (along the line III—III of Figure 4); and Figure 4 is a sectional elevational view taken substantially along the line IV—IV of Figure 3.

As shown on the drawings:

In Figures 1 and 2, a heating unit indicated generally by the reference numeral 10 comprises a glass vessel 11 having a generally cylindrical neck 11a equipped with a pouring spout 11b and having a generally spherical body portion 11c. The spherical body portion 11c seats in a generally spherical socket 12a of a receiver or mounting means 12. The receiver 12 is provided with a flat bottom 12b for the socket 12a upon which rests a flat bottom 11d for the vessel 11. The spherical portion 11c of the glass vessel 11 is provided with a first electrical contact 13, which is shown in Figure 1 as a low resistance metallized coating in the form of a flat circular band extending around the entire periphery of the spherical body 11c at approximately one-half the height thereof. The low resistance terminal 13 (which is shown in the drawing in greatly exaggerated thickness) is formed by applying a silver metallizing composition and firing it on the glass in a well known manner. As here shown the terminal or contact 13 is mounted at approximately the middle of the spherical body 11c for the sake of convenience so that the spherical body 11c may be readily lifted out of the socket 12a for the receiver 12 and also the terminal 13 may readily engage a fixed electrical contact 14 protectively enclosed by the upper portion of the receiver 12 (although exposed at the surface of the socket 12a). For convenience the fixed terminal 14 affords only a point contact whereas the terminal 13 mounted on the glass vessel 11 extends around the full periphery thereof so as to always make contact with the fixed terminal 14 no matter how the glass vessel may be rotated in the socket 12a.

A second electrical contact 15 spaced from the first electrical contact 13 is also mounted on the glass vessel 11, in this case at the outside of the bottom 11b of the vessel. The second electrical contact 15 (which is also shown in greatly exaggerated thickness) is generally circular in shape and also consists of a low resistance metallizing coating formed by applying a silver metallizing composition and firing it on the glass in the known manner. The glass vessel 11 is made of Pyrex in the instant embodiment. The receiver 12 may also be made of Pyrex glass, as it is here shown in a generally diagrammatic view; but in commercial practice the receiver 12 is preferably formed of a metal basic structure with a porcelain enamel coating thereon to present a refractory insulator wall for the socket 12a.

The terms "insulator" and "conductor" with respect to both heat and electricity are well understood by those skilled in the art, notwithstanding the fact that all materials are generally considered to have at least limited heat and electrical conductivity and no material is considered to be a perfect insulator. For the purpose of simplification in this specification, it will be appreciated that heat conductivity is not as important as electrical conductivity. In the electrical arts, electrical conductors are usually understood to have resistivity which is defined as the resistance of a sample of the material having both a length and cross-section of unity. The resistance of a cubic centimeter and a circular-mil-foot are the most common units of resistivity. Herein, electrical insulators are considered to have resistivities of at least about $10^5$ ohms per centimeter cubed, and preferably $10^{10}$ ohms per centimeter cubed. It is generally understood that electrical conductors have resistivities in microhms per centimeter cubed, of not more than about 100 (as in the case of "Nichrome" heating elements) and preferably not more than about 20; but it will be apparent that the resistivities of the instant nickel coatings here employed are substantially greater, although these elements conduct an electric current (as will be demonstrated hereinafter).

The second electrical contact 15 rests upon a second fixed terminal 16 in the receiver 12 that is exposed to the socket 12a at the bottom 12b thereof. The fixed terminals 14 and 16 are connected to a source of electrical energy such as a generator G in the usual manner. The receiver may also contain a switch (not shown) or the mere insertion of the flask 11 in the socket 12a, as here shown, may serve to close the circuit.

An elongated heating element 17 extends between the spaced electrical contacts 13 and 15 mounted on the outside surface of the glass vessel 11. Again, the thickness of the heating element 17 is greatly exaggerated. As will be seen best from Figure 2, the heating element 17 is an elongated strip which extends from the second contact 15 at the vessel bottom 11d spirally outwardly along the bottom until it reaches the curved spherical body portion 11c, whereupon the elongated heating element 17 continues in generally spiral configuration up the sides. Only the first half loop 17a of the spiral on the side of the vessel is shown in Figure 2; but it will be appreciated that the spiral heating element 17 circles continuously upwardly around the spherical body 11c through the first loop 17a, a second loop 17b, and a third loop 17c (Figure 1) until contact is made with the low resistance contact 13 at a point 17d.

The heating element 17 is formed by depositing a layer of nickel along the helical surface portion herein indicated from a bath consisting essentially of an aqueous solution of nickel salt and a hypophosphite, in a manner which will be described in detail hereinafter. In general, however, it will be noted that the flask 11 is first prepared for receiving the nickel coating by sand blasting the surface thereof and then the flask is dipped in the aqueous solution for a period of time sufficient to deposit a coating of 0.0001 inch thickness. The flask is then removed and a spiral line is burned through the plating to separate the spiral turns 17a, 17b, 17c, etc. In an alternative procedure, the surface of the flask 11 may be masked so that the nickel is deposited only along the spirally aligned portions 17a, 17b, 17c.

A number of such flasks were prepared, in each case using a nickel plating thickness of 0.0001 inch on 100 cc. flasks and the width and length of the spiral ribbon 17 on each flask was measured; and different voltages were applied across the ribbons 17 (between the contacts 15 and 13) to ascertain the behavior of the ribbons 17 on the Pyrex glass flasks. The results obtained for each of a number of test flasks are as follows:

Flask A: ½–⅜" ribbon 33" long:

| Volts | Amps. | Watts | Ohms |
|---|---|---|---|
| 10 | .180 | 1.8 | 55.6 |
| 20 | .340 | 6.8 | 58.8 |
| 30 | .480 | 14.4 | 62.5 |
| 40 | .640 | 25.6 | 62 |
| 50 | .780 | 39.0 | 64 |
| 60 | .940 | 56.4 | 64 |
| 70 | 1.125 | 78.8 | 65 |
| 80 | 1.275 | 102.0 | 63 |
| 90 | 1.425 | 128.3 | 63 |
| 100 | 1.6 | 160.0 | 62.5 |
| 110 | 1.780 | 195.8 | 62 |
| 120 | 1.95 | 234.0 | 61 |

Flask B: ½" ribbon 33" long:

| Amps. | Volts | Watts | Ohms |
|---|---|---|---|
| .5 | 31 | 15.5 | 62 |
| .75 | 50 | 37.5 | 66.7 |
| 1.0 | 79 | 79.0 | 79 |
| 1.25 | 102 | 127.5 | 81.6 |
| 1.5 | 122 | 183.0 | 81.4 |
| 1.75 | 142 | 248.5 | 81.2 |
| 2.0 | 160 | 320.0 | 80.2 |
| 2.25 | 190 | 428.0 | 84.4 |
| 2.5 | 202 | 505.0 | 80.8 |

Flask C: ½" ribbon 34½" long:

| Amps. | Volts | Ohms |
|---|---|---|
| .5 | 33 | 66 |
| .75 | 52 | 69 |
| 1.0 | 70 | 70 |
| 1.25 | 90 | 72 |
| 1.5 | 107 | 71.5 |
| 1.75 | 151 | 86 |
| 2.0 | 168 | 84 |
| 2.25 | 200 | 89 |
| 2.5 | 220 | 88 |

Flask D: ½" ribbon 29" long:

| Amps. | Volts | Ohms |
|---|---|---|
| .5 | 25 | 50 |
| .75 | 41 | 55 |
| 1.0 | 56 | 56 |
| 1.25 | 72 | 57.5 |
| 1.5 | 86 | 57.5 |
| 1.75 | 102 | 58 |
| 2.0 | 116 | 58 |
| 2.25 | 132 | 58.5 |
| 2.5 | 148 | 59 |

Flask E: ½" ribbon 23½" long:

| Amps. | Volts | Ohms |
|---|---|---|
| .5 | 10 | 20 |
| .75 | 15 | 20 |
| 1.0 | 24 | 24 |
| 1.25 | 30 | 24 |
| 1.5 | 36 | 24 |
| 1.75 | 42 | 24 |
| 2.0 | 50 | 25 |
| 2.25 | 56 | 25 |
| 2.5 | 62 | 25 |
| 3.0 | 75 | 25 |
| 3.5 | 88 | 25 |
| 4.0 | 100 | 25 |
| 4.9 | 125 | 25 |

Flask F: ⁷⁄₁₆" ribbon 36" long:

| Amps. | Volts | Ohms |
|---|---|---|
| .5 | 20 | 40 |
| .75 | 33 | 44 |
| 1.0 | 45 | 45 |
| 1.5 | 70 | 47 |
| 1.75 | 82 | 47 |
| 2.0 | 94 | 47 |
| 2.25 | 106 | 47 |
| 2.5 | 120 | 48 |

Flask G: ⅜" ribbon 26" long:

| Amps. | Volts | Ohms |
|---|---|---|
| .5 | 16 | 32 |
| .75 | 28 | 37 |
| 1.0 | 38 | 38 |
| 1.25 | 50 | 40 |
| 1.5 | 60 | 40 |
| 1.75 | 70 | 40 |
| 2.0 | 80 | 40 |
| 2.25 | 90 | 40 |
| 2.5 | 100 | 40 |
| 3.0 | 120 | 40 |

Flask H: 5/16" ribbon 28" long:

| Amps. | Volts | Ohms |
|---|---|---|
| .5 | 20 | 40 |
| .75 | 33 | 44 |
| 1.0 | 46 | 46 |
| 1.25 | 59 | 47 |
| 1.5 | 71 | 47 |
| 1.75 | 84 | 48 |
| 2.0 | 96 | 48 |
| 2.25 | 108 | 48 |
| 2.5 | 120 | 48 |

It should be noted that the resistivity of the ribbon increases with temperature increases much more (i.e. about 3 times) than "Nichrome" wire; and this affords temperature control advantages in that the ribbon acts in part as its own thermostat. Another unusual feature of the instant flasks was that they were capable of boiling tap water in from 80 to 85 seconds (developing 300 watts) and 48 to 52 seconds (developing 500 watts) which is substantially less than the time required for boiling tap water in a flask of this size using an ordinary hot plate or a gas burner.

Flasks were also made whereon the thickness of the element 17 was 0.0005 and 0.00075 and it was found that the ribbons of thickness 0.0005 adhered quite well to the glass surface, but ribbons of thickness 0.00075 tended to separate. Actually, ribbon thicknesses of 0.0002 or less have been found to give the best adherence and ribbon thicknesses as low as 0.00001 can be employed in the practice of the instant invention. A ribbon thickness of 0.0001 has been found to be best. Widths of ¼ to 1 inch are also preferred for this use.

When the current is applied to the ribbons on the glass vessel 11, the temperature of the ribbon 17 is raised immediately to about 700–1000° F. (at which temperatures the ribbon does not rupture) and it is found that the temperature drops very rapidly as soon as the current is taken off. This is of distinct advantage in temperature control and is a clear difference over the usual heating element which tends to remain hot for a substantial period of time after the electric current has been cut off. Another feature of particular interest is that the temperature rise in the flask 11 can be checked by positioning a thermometer bulb at various locations within the flask and it is found that, if the thermometer bulb is positioned in approximately the center of the spherical portion 11c, the temperature rises extremely rapidly. This is believed to be due to heat radiation from the inside surfaces of the ribbon 17 (which would be focused at the center of the sphere). The instant ribbon 17 is thus believed to provide a great deal of its heat in the form of radiant energy.

Referring now to Figures 3 and 4, which show another embodiment 20 of the instant invention that is here shown as the hot plate 20, it will be noted that the hot plate 20 comprises a solid electric insulator body in the form of an upper 21a and a lower 21b disk-shaped Pyrex glass member. The body 21 is suitably seated in a disk-shaped socket 22a of a receiver 22, which mounts a first electrical contact 23 that is exposed at the peripheral wall of the socket 22a and a second electrical contact 24 that is exposed at the central bottom portion of the socket 22a. The electrical contacts 23 and 24 are, of course, connected through a switch S and a source of electric power such as a generator A to close the circuit. The insulator body 21 has a peripherally mounted annular electrical contact 25 formed by applying a silver metallizing composition and firing the same on the glass surface in the known manner. For the sake of simplification, the upper and lower insulator body portions 21a and 21b are shown slightly spaced from each other, although it will be appreciated that in a normal commercial embodiment these members will be substantially flush against each other, and the peripheral contact 25 is substantially aligned with the opposed faces thereof. The peripheral contact 25 makes electrical connection with the receiver contact 23 that is exposed at the peripheral wall of the socket 22a. It will be appreciated that the main body of the receiver 22, or at least those portions thereof exposed to the socket 22a except for the contacts 23 and 24 are refractory insulators. As here shown, the entire body of the receiver 22 is a refractory insulator such as glass.

The bottom disk member 21b has an axially aligned contact 26 extending therethrough making electrical contact with the receiver contact 24 at the bottom and making electrical contact with a low resistance metallizing coating 27 between the upper and lower body portions 21a and 21b. The low resistance metallizing coating 27 is formed by applying a silver metallizing composition and firing it on the glass in the known manner. An elongated heating element 28 extends between the metallizing coating 27 and the peripheral metallizing coating contact 25, in the form of a spiral as is best seen in Figure 3. Configurations other than a spiral may, of course, be used in the practice of the instant invention, but this is the most satisfactory arrangement. The spiral ribbon 28 is applied in the same manner as the spiral 17 hereinbefore described and the resulting hot plate 20 has a number of unusual properties such as the ability to heat up very rapidly and also the ability to cool down very rapidly once the electric current has been cut off.

*Specific nickel coating procedure*

The present invention involves processes of chemical nickel plating of non-conductive and non-catalytic solid materials by methods which are known and are disclosed in the patented art.

In Gregoire Gutzeit and Abraham Krieg U.S. Patent No. 2,658,841, granted November 10, 1953, there is disclosed a process of chemically plating with nickel, metals and other catalytic materials, by contacting the materials with an acid bath containing nickel ions and hypophosphite ions and a buffer. This process is carried on under certain optimum conditions, which are as follows:

The ratio between nickel ions and hypophosphite ions in the bath, expressed in molar concentrations, is within the range from 0.25 to 0.60; the absolute concentration of hypophosphite ions in the bath expressed in mole/liter, is within the range from 0.15 to 0.35; the absolute concentration of the buffer in the bath is approximately equivalent to two carboxyl groups for every nickel ion that can be deposited, for instance, in the case of sodium acetate, 0.120 mole/liter of acetate ion; the initial pH of the bath is within the approximate range from 4.5 to 5.6; the temperature of the bath is slightly below the boiling point thereof, about 98° centigrade; and the ratio between the volume of the bath, expressed in cubic centimeters ($cm.^3$), and the surface area of the material that is to be plated expressed in square centimeters ($cm.^2$), ($V/A$), is not greater than 10. The buffers mentioned in that application and employed in the tests therein referred to are soluble salts of simple short chain aliphatic monocarboxylic acids with an ionization constant pKa, higher than 4.7; such as, acetic acid, butyric acid, propionic acid, etc.

In Gregoire Gutzeit and Ernest J. Ramirez U.S. Patent No. 2,658,842, granted November 10, 1953, there is disclosed a process of chemically plating with nickel, metals and other catalytic materials, by contacting the materials with an acid bath containing nickel ions and hypophosphite ions and an exaltant. This process is carried on under certain optimum conditions, which are as follows:

The ratio between nickel ions and hypophosphite ions in the bath, expressed in molar concentrations, is within the range from 0.25 to 1.60; the absolute concentration of hypophosphite ions in the bath, expressed in moles/liter, is within the range of 0.15 to 1.20; the absolute concentration of the exaltant in the bath is approximately equivalent to two carboxyl groups for every nickel ion that can be deposited, for instance, in the case of sodium succinate, at least 0.05 mole/liter of succinate ion; the initial pH of the bath is within the approximate range 4.3 to 6.8; the temperature of the bath is slightly below the boiling point thereof, about 99° centigrade; and the ratio between the volume of the bath, expressed in cm.$^3$, and the surface area of the material that is to be plated expressed in cm.$^2$($V/A$), is not greater than 10. The exaltants mentioned in this last mentioned application and employed in the tests therein referred to are soluble salts of simple short chain aliphatic dicarboxylic acids with an ionization constant $pK_2$ higher than 5.4; such as malonic acid, succinic acid, glutaric acid, etc.

In the patents referred to, it was pointed out that the catalytic materials that could be plated with nickel employing the baths and processes set forth were materials which cause the plating reaction:

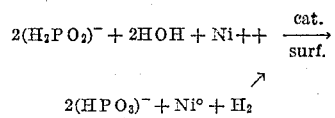

$$2(H_2PO_2)^- + 2HOH + Ni^{++} \xrightarrow[\text{surf.}]{\text{cat.}}$$
$$\nearrow$$
$$2(HPO_3)^- + Ni^\circ + H_2$$

For instance, using nickel chloride to provide the nickel ion and sodium hypophosphite to provide the hypophosphite ion:

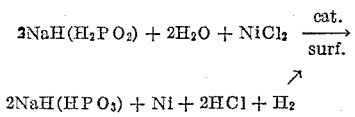

$$2NaH(H_2PO_2) + 2H_2O + NiCl_2 \xrightarrow[\text{surf.}]{\text{cat.}}$$
$$\nearrow$$
$$2NaH(HPO_3) + Ni + 2HCl + H_2$$

In other words, materials that catalyze the oxidation of the hypophosphite ion to the phosphite ion, while reducing water to atomic hydrogen, and, at the same time, promoting the formation of molecular hydrogen comprise catalytic materials. This reaction can be ascertained by observing and measuring the volume of hydrogen gas evolved in an aqueous solution of a soluble hypophosphite upon addition of the catalytic material, preferably at the highest possible temperature below the boiling point of the solution. The following elements are catalytic: Cu, Ag, Au, Be, B, Ge, Al, Tl, Si, C, V, Mo, W, Cr, Se, Te, Fe, Co, Ni, Pd and Pt; and the following elements are definitely noncatalytic: Bi, Cd, Sn, Pb and Mn.

In the practice of the instant invention, nonconductive and noncatalytic materials, such as glass, plastics, hard rubber, wood, ceramics, etc., do not cause the plating reactions (1) and (2); and thus cannot be plated with nickel directly in accordance with the processes set forth in the applications mentioned.

In accordance with the present invention, in order to obtain nickel chemical plating of nonconductive and noncatalytic materials, such as glass, plastics, hard rubber, wood, ceramics, etc., it is necessary first to prepare or condition the surface of the material prior to contacting it with the chemical nickel plating bath. More particularly, the surface of the material is modified so as to form thereon firmly anchored growth nuclei. It is not necessary to achieve a complete coverage of the surface of the material with the growth nuclei, as the nickel plating will spread for a certain distance from each growth nucleus in the two dimensions along the surface of the material as it builds up in the third dimension upon the growth nucleus, thereby obtaining ultimately a complete and homogeneous coating of nickel upon the surface of the material. Also, the surface of the material is modified to eliminate polarization of the areas between the growth nuclei by effecting the presentation in these areas of a fresh surface.

In one form of the method, the surface of a nonconductive and noncatalytic material of the character referred to may be prepared for chemical nickel plating by freshening and contaminating it with traces of a catalyst in such a manner that the catalytic particles are securely anchored in place upon the freshened surface. By simply dusting the surface with a finely divided catalytic powder, such as aluminum, carbon, etc., a coating is provided so that nonconductive and noncatalytic material of the character mentioned is prepared for chemical nickel plating. However, in order to obtain good adhesion of the subsequently deposited nickel to the material, the catalyst must be firmly anchored to the surface of the material and the surface of the material must be fresh; whereby as many growth nuclei as possible are securely anchored to the surface of the material, and the noncatalytic areas on the surface of the material are not polarized. These conditions may ordinarily be obtained by removing the surface skin of the material as the catalyst is embedded in the freshly presented surface of the material. While the catalytic powder may take the form of any one or combination of the catalytic elements previously mentioned, from a practical standpoint nickel, copper, cobalt, carbon and aluminum, as well as the alloys brass and bronze, have been found to be most useful. Specifically, beryllium cannot be used in the presence of an acetate buffer in the nickel plating bath as an insoluble acetate is formed; iron has a tendency to rust rapidly, gold and silver are too expensive, etc.

In another form of the method where an artificial or compounded non-conductive and noncatalytic material is produced by forming, molding or casting, the catalyst may be mixed with the basic material prior to forming, etc. As only the amount of catalyst present at the surface of the formed material is useful, enough catalyst should be added to the basic material initially to provide adequate growth nuclei at the boundary or surface of the formed material. The formed material is subsequently prepared by sanding, blasting, brushing, tumbling, chemical etching, etc., to expose a fresh surface thereon prior to being subjected to the nickel plating bath. For instance, by compounding a thermosetting plastic molding powder (e.g. Bakelite), with 5% aluminum powder, by weight, molding the compound under heat and pressure, then subjecting the article thus formed of the compound to a fine abrading action by liquid honing in order to prepare the surface thereof, and, finally, chemically nickel plating the prepared surface of the article, an excellent adherent and continuous nickel coating may be obtained.

A further form of the method is generally applicable to most nonconductive and noncatalytic materials, and comprises employing mechanical pressure to incorporate the catalyst into the surface of the material while simultaneously freshening the surface of the material. This can be achieved by such operations as wet or dry blasting, buffing, tumbling, sanding, wire wheel brushing, and the like, using a mixture of abrasive and catalyst materials, or alternatively, using a hard catalyst itself as the abrasive. Thus, for instance, liquid honing with "Vapor Blast" equipment using Novaculite 325 or 1250 mesh abrasive mixed with 10% aluminum powder has been found to be excellent in the preparation of the surfaces of materials for chemical nickel plating. Also, dry blasting with 325 mesh emery powder and 5% of chemically reduced nickel has been found to be useful in the preparation of the surfaces of the materials; the same is true with activated sanded surfaces obtained by powdering the sand belt with a catalyst, such as chemically reduced nickel in powder form.

In a still further form of the method, the surface of a nonconductive and noncatalytic material may be prepared for chemical nickel plating by freshening the surface of the material by mechanically employing one of the abrasive techniques mentioned and then by contaminating the freshened surface with a noncatalytic substance in powdered form to provide the growth nuclei on the freshened surface of the material, the noncatalytic substance constituting a noncatalytic metal whose solution potential is greater than that of nickel, such, for example, as manganese, zinc, magnesium and cadmium. In other words, by depositing on the freshened surface of the nonconductive and noncatalyst material, fine particles or a thin film of a metal less noble than nickel, an ion replacement occurs in the chemical nickel plating bath between the nickel ions and the atoms of the less noble metal, whereby the nickel replaces the less noble metal and then acts as a catalyst. In the plating reactions (1) and (2), the advantage of this form of the method resides in the fact that soft less noble metals, such as zinc and cadmium, are easy to apply since these metals with low melting points can be flame-sprayed upon the freshened surface of the material. On the other hand, the more brittle, less noble metals, such as manganese, are more amenable to dusting upon the freshened surface of the material. The solution potential of nickel is about 0.25; and the following less noble metals have higher solution potentials: Mg, Al, Mn, Zn, Cr, Ga, Fe and Cd. The elements Al, Cr, Ga, and Fe are catalytic themselves, and the solution potentials of the other elements are: Mg 234, Mn, 1.05, Zn, 0.76, and Cd, 0.40.

The following demonstrates the application of the nickel ribbons 17 to the glass vessel 11 (or the nickel coating 28 on the plate 21b). The 100 cc. glass flasks 11 were sand-blasted and activated, i.e., the surface skin was rubbed with fine emery paper which had been rubbed, respectively, with solid pieces of zinc, magnesium and cadmium. In the case of manganese, the flasks, after sand-blasting were dusted with the metal powder and rubbed by hand. Each of these samples was then placed in 500 cubic centimeters of a chemical nickel plating bath containing 0.07 mole/liter of nickel chloride, 0.225 mole/liter of sodium hypophosphite and 0.02 mole/liter of sodium succinate. The initial pH of the bath was adjusted to 5.1 with HCl and the bath was heated to 98° C. The time necessary to initiate nickel plating for Mn, Zn and Mg, is only a few minutes, but is longer for Cd. The flasks were plated in each case for a period of time sufficient to apply a 0.0001 inch coating; and the test results hereinbefore indicated for the coatings (when a current is applied thereto) are the same (regardless of the catalyst used).

It will be understood that modifications and variations may be effected without departing from the spirit and scope of the novel concepts of this invention.

I claim as my invention:

1. A heating unit comprising a solid electric insulator body, spaced electrical contacts mounted on said body, and a heating element comprising a nickel layer having a thickness of between 0.00001 and 0.0005 inch, said element extending between said contacts and being directly bonded to and in direct contact with said insulator body, said element being formed by depositing said layer from a bath consisting essentially of an aqueous solution of a nickel salt and a hypophosphite.

2. A heating unit of the character defined in claim 1, in which the solid electric insulator body is constructed of glass.

3. A vessel for heating liquids comprising a glass body, spaced electrical contacts mounted on the outside thereof, and a heating element comprising a nickel layer having a thickness of between 0.00001 and 0.0005 inch, said element extending between said contacts and being directly bonded to and in direct contact with said glass body, said element being formed by depositing said layer from a bath consisting essentially of an aqueous solution of a nickel salt and a hypophosphite.

4. A vessel of the character defined in claim 3, in which the glass body is generally spherical in shape, and in which the heating element extends in generally spiral configuration around the outside of said body.

References Cited in the file of this patent

UNITED STATES PATENTS

| | | |
|---|---|---|
| 540,073 | Reed | May 28, 1895 |
| 1,563,731 | Ducas | Dec. 1, 1925 |
| 2,611,069 | Frazier | Sept. 16, 1952 |
| 2,617,741 | Lytle | Nov. 11, 1952 |
| 2,628,927 | Colbert | Feb. 17, 1953 |
| 2,690,401 | Gutzeit | Sept. 28, 1954 |
| 2,690,403 | Gutzeit | Sept. 28, 1954 |

FOREIGN PATENTS

| | | |
|---|---|---|
| 650,676 | Great Britain | Feb. 28, 1951 |